United States Patent [19]
Kiriyama

[11] Patent Number: 5,561,466
[45] Date of Patent: Oct. 1, 1996

[54] VIDEO AND AUDIO DATA MULTIPLEXING INTO ATM CELLS WITH NO DUMMY CELL USED AND ATM CELL DEMULTIPLEXING

[75] Inventor: Takashi Kiriyama, Tokyo, Japan

[73] Assignee: NEC Corporation, Tokyo, Japan

[21] Appl. No.: 264,349

[22] Filed: Jun. 23, 1994

[30] Foreign Application Priority Data

Jun. 23, 1993 [JP] Japan .................................. 5-176054
Jun. 30, 1993 [JP] Japan .................................. 5-188805

[51] Int. Cl.⁶ .................................................. H04N 7/12
[52] U.S. Cl. ........................ 348/423; 348/500; 370/94.1
[58] Field of Search ...................... 348/461, 419, 348/423, 500; 370/94.2, 94.1, 112, 60, 60.1; H04N 7/12

[56] References Cited

U.S. PATENT DOCUMENTS

| | | | |
|---|---|---|---|
| 4,689,676 | 8/1987 | Nakajima et al. | 348/513 |
| 4,851,909 | 7/1989 | Noske et al. | 348/512 |
| 5,227,876 | 7/1993 | Cucchi et al. | 348/423 |
| 5,231,492 | 7/1993 | Dangi et al. | 348/17 |
| 5,287,182 | 2/1994 | Haskell et al. | 348/500 |
| 5,351,090 | 9/1994 | Nakamura | 348/484 |
| 5,379,116 | 1/1995 | Wada et al. | 358/431 |
| 5,379,295 | 1/1995 | Yonehara | 370/60 |
| 5,481,543 | 1/1996 | Veltman | 370/94.1 |
| 5,500,672 | 3/1996 | Fujii | 348/17 |

*Primary Examiner*—John K. Peng
*Assistant Examiner*—Chris Grant
*Attorney, Agent, or Firm*—Sughrue, Mion, Zinn, Macpeak & Seas

[57] ABSTRACT

For cell multiplexing an original video signal and an original audio signal which are encoded into an encoded video signal and an encoded audio signal, a buffer unit buffers the encoded video signal for read out by a control unit as video data of a common data length. The video data and the encoded audio signal are supplied to processors for inserting additional information, such as a header, therein for production of video and audio cells, which are multiplexed by a cell multiplexer into a cell multiplexed video and audio signal. Preferably, the buffer unit comprises a video buffer for buffering the encoded video signal for read out as read video data, a delay detector for detecting a delay needed to produce the read out data, and a delay information multiplexer for multiplexing, on each read out datum for production of the read out data, delay information indicative of the delay. The cell multiplexer uses with a higher priority degree each audio cell concurrently supplied thereto with one of the video cells and uses at least one empty cell while none of the video and the audio cells are supplied thereto. For reproduction of the original video and audio signals, a data demultiplexer device is adapted to the cell multiplexed video and audio signal in which the delay information is multiplexed on each video cell.

17 Claims, 9 Drawing Sheets

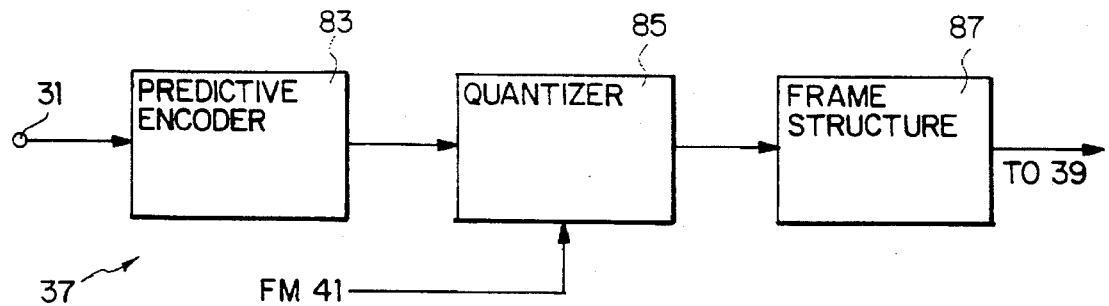
FIG. 9
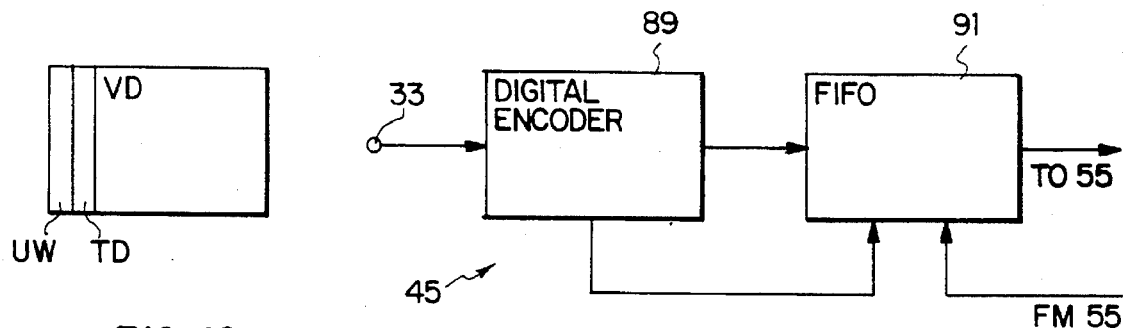
FIG. 10
FIG. 11
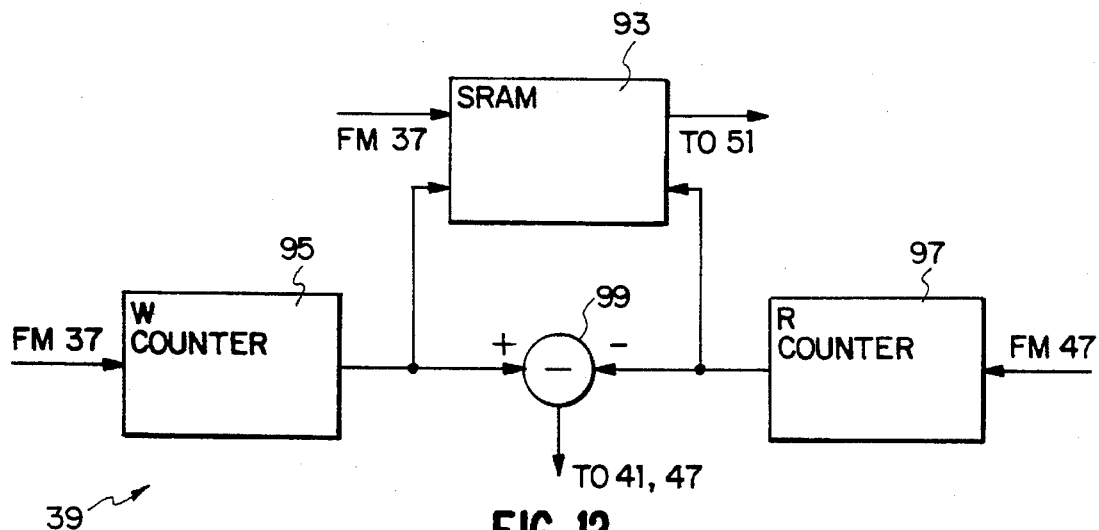
FIG. 12
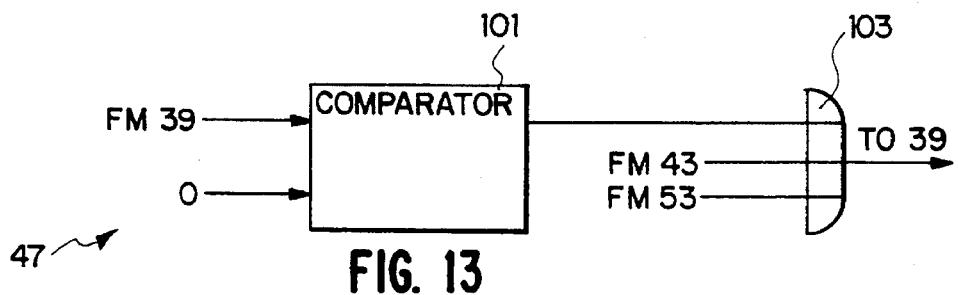
FIG. 13

VIDEO AND AUDIO DATA MULTIPLEXING INTO ATM CELLS WITH NO DUMMY CELL USED AND ATM CELL DEMULTIPLEXING

BACKGROUND OF THE INVENTION

This invention relates to data multiplexing an original video signal and an original audio signal into a cell multiplexed video and audio signal, such as a sequence of asynchronous transfer mode (ATM) cells, and to data demultiplexing the cell multiplexed video and audio signal into the original video signal and the original audio signal. Such data multiplexing and data demultiplexing are used typically in a communication network of an asynchronous transfer mode multimedia system. More particularly, this invention relates to a data multiplexing method, to a data multiplexer device, and to a data demultiplexer device.

It is already known to deal with data multiplexing and data demultiplexing of the type described. As will later be described in greater detail, a conventional data multiplexer device comprises a video processor unit for processing an original video signal into a succession of video cells having a predetermined common cell length. An audio processor unit processes an original audio signal into a like succession of audio cells having the common cell length. With additional information used as a header and/or trailer in each of the video and the audio cells, a multiplexer unit multiplexes the video and the audio cells into a cell multiplexed video and audio signal.

It should be noted in connection with the conventional data multiplexer device that the video cells correspond in number to an amount of video information carried by the original video signal. This number has consequently been determined to cover a maximum amount of the video information by inserting dummy cells in the succession of video cells and by multiplexing the video and the audio cells into the cell multiplexed video and audio signal together with the dummy cells. As a result, the cell multiplexed video and audio signal unavoidably has a deteriorated transmission efficiency.

On processed into the video cells, the original video signal is first encoded into an encoded video signal for storage in a buffer memory as a buffered datum. From the buffer memory, the buffered datum is read out as video data of a common data length which is equal to the common cell length. Inasmuch as the buffer memory is used, the video data are produced with a delay relative to the encoded video signal.

On demultiplexing the cell multiplexed video and audio signal by a data demultiplexer device into reproductions of the original video signal and the original audio signal, it is necessary to keep the delay constant. It has, however, been impossible for the conventional data multiplexer device to produce the cell multiplexed video and audio signal together with information indicative of the delay. As a consequence, it has been impossible to keep between the original video and audio signals in the reproductions the lip synchronism as called in the art.

SUMMARY OF THE INVENTION

It is consequently an object of the present invention to provide a data multiplexing method of multiplexing an original video signal and an original audio signal into a cell multiplexed video and audio signal with an excellent transmission efficiency achieved.

It is another object of this invention to provide a data multiplexing method which is of the type described and which makes it possible to demultiplex the cell multiplexed video and audio signal into reproductions of the original video and audio signals with a lip synchronism kept.

It is a different object of this invention to provide a data multiplexer device for carrying out the data multiplexing method of the type described.

It is another different object of this invention to provide a data multiplexer device which is of the type described and by which it is possible to make the cell multiplexed video and audio signal carry propagation delay information.

It is still another different object of this invention to provide a data multiplexer device which is of the type described and by which the cell multiplexed video and audio signal is produced for data demultiplexing into the reproductions with the lip synchronism kept between the original video and audio signals in the reproductions.

It is a further different object of this invention to provide a data demultiplexer device for demultiplexing the cell multiplexed video and audio signal of the type described.

It is a still further different object of this invention to provide a data demultiplexer device which is of the type described and which can demultiplex the cell multiplexed video and audio signal with the lip synchronism kept between the original video and audio signals in the reproductions.

Other objects of this invention will become clear as the description proceeds.

In accordance with an aspect of this invention, there is provided a data multiplexing method of multiplexing an original video signal and an original audio signal into a cell multiplexed video and audio signal, comprising the steps of: (A) encoding the original video signal into an encoded video signal; (B) buffering the encoded video signal as a buffered video datum; (C) controlling read out of the buffered video datum as video data of a predetermined common data length; (D) processing the video data into video cells with addition of additional video information to each of the video data; (E) encoding the original audio signal into an encoded audio signal; (F) processing the encoded audio signal into audio cells with addition of additional audio information to each of audio data derived from the encoded audio signal to have the common data length; and (G) multiplexing the video cells and the audio cells into the cell multiplexed video and audio signal.

In accordance with a different aspect of this invention, there is provided a data multiplexer device which is for multiplexing an original video signal and an original audio signal into a cell multiplexed video and audio signal and which comprises: (A) video encoder means for encoding the original video signal into an encoded video signal; (B) video buffer means for buffering the encoded video signal as a buffered video datum; (C) video control means for controlling read out of the buffered video datum to produce video data of a predetermnide common data length; (D) video processor means for processing the video data into video cells with addition of additional video information to each of the video data; (E) audio encoder means for encoding the original audio signal into an encoder audio signal; (F) audio processor means for processing the encoded audio signal into audio cells by adding additional audio information to each of audio data derived from the encoded audio signal to have the common data length; and (G) multiplexer means for multiplexing the video cells and the audio cells into the cell multiplexed video and audio signal.

In accordance with a further different aspect of this invention, there is provided a data demultiplexer device which is for demultiplexing a cell multiplexed video and audio signal into reproductions of an original video signal and an original audio signal with the cell multiplexed video and audio signal produced by time division multiplexing video cell data of a predetermined common data length, propagation delay information representative of a delay used in producing the video cell data and in demultiplexing the video cell data into the reproduction of the original video signal, and audio cell data of the common data length, and which comprises: (A) demultiplexer means for demultiplexing the cell multiplexed video and audio signal into the audio cell data and multiplexed data of the video cell data and the propagation delay information; (B) separator means for separating the multiplexed data into separated video data and separated information; (C) video buffer means for buffering the separated video data as a buffered video datum; (D) video control means for controlling read out of the buffered video datum as read video data in response to the separated information; (E) audio buffer means for buffering the audio cell data as a buffered audio datum of an audio buffer occupancy; (F) audio control means for controlling read out of the buffered audio datum as read audio data in response to the audio buffer occupancy; and (G) decoder means for decoding the read video data and the read audio data into the reproductions.

BRIEF DESCRIPTION OF THE DRAWING

FIG. 9 is a block diagram of a video encoder for use in the data multiplexer device illustrated in FIG. 5;

FIG. 10 is a schematic representation of a video frame datum produced by the video encoder depicted in FIG. 9;

FIG. 11 is a block diagram of an audio encoder for use in the data multiplexer device shown in FIG. 5;

FIG. 12 is a block diagram of a buffer memory for use in the data multiplexer device depicted in FIG. 5;

FIG. 13 is a block diagram of a buffer read controller for use in the data multiplexer device shown in FIG. 5;

DESCRIPTION OF THE PREFERRED EMBODIMENTS

Figure 1:
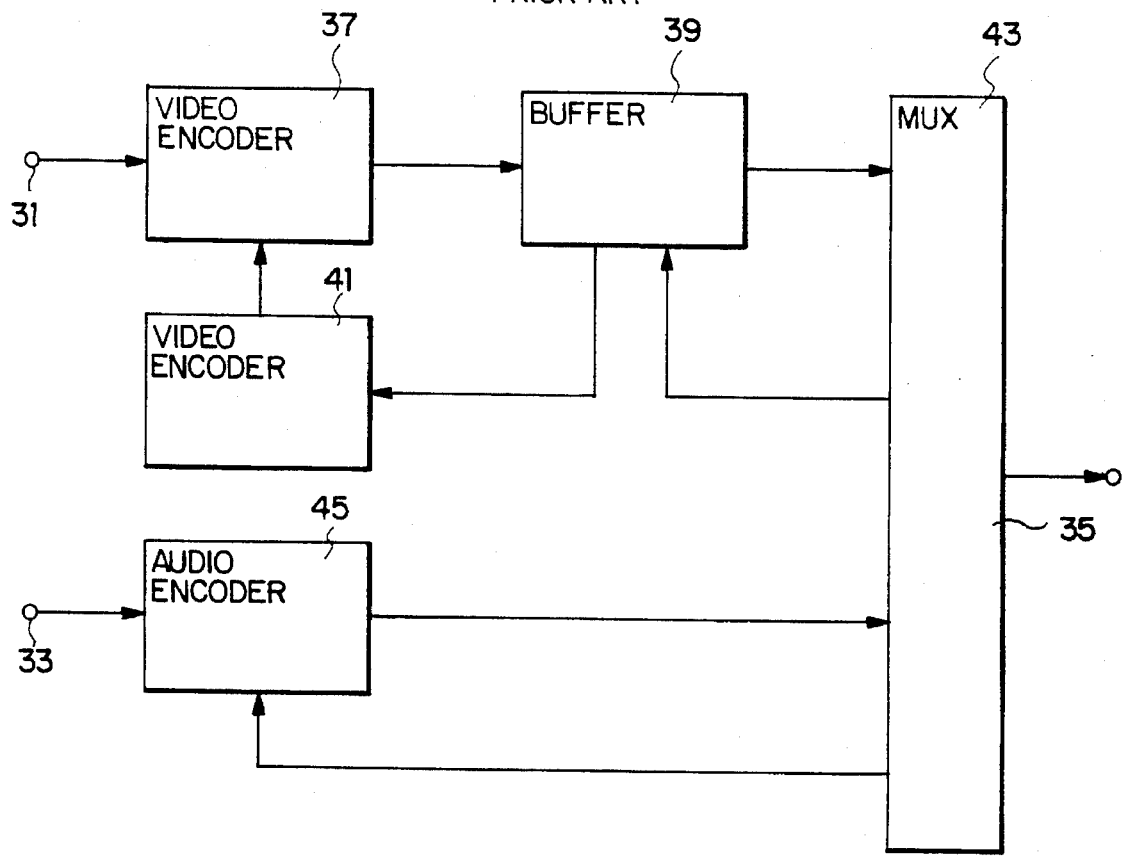
FIG. 1 is a block diagram of a conventional data multiplexer device.

Referring to FIG. 1, a conventional data multiplexer device will first be described in order to facilitate an understanding of the present invention. The data multiplexer device has a video input terminal 31, an audio input terminal 33, and a device output terminal 35. An original video signal is supplied to the video input terminal 31. An original audio signal is fed to the audio input terminal 33. The data multiplexer device data multiplexes the original video and audio signals into a cell multiplexed video and audio signal for delivery to the device output terminal 35.

Connected to the video input terminal 31, a video encoder 37 digitizes the original video signal into an encoded video signal. If desired, the video encoder 37 produces the encoded video signal with data compression. At any rate, such an encoded video signal is sent to a buffer memory 39 and buffered therein as a buffered video datum of a buffer occupancy.

On so delivering the encoded video signal to the buffer memory 39, a video encoder controller 41 is supplied with a buffer occupancy signal BOC represenative of the buffer occupancy. Controlled by the buffer occupancy signal, the video encoder controller 41 sends a video encoder control signal to the video encoder 37. Controlled by the video encoder control signal, the video encoder 37 digitizes the original video signal into the encoded video signal for supply to the buffer memory 39.

In the manner which will presently be described, a multiplexer (MUX) 43 produces a video read control signal VRCNT and an audio read control signal ARCNT. Controlled by the video read control signal, the buffer memory 39 delivers the buffered video datum to the multiplexer 43 as video data VD.

Connected to the audio input terminal 33, an audio encoder 45 digitizes the original audio signal into an encoded audio signal. Like the buffer memory 39, the audio encoder 45 is controlled by the audio read control signal to supply the multiplexer 43 with audio data AD.

Referring afresh to FIG. 2 and again to FIG. 1, the video and the audio read control signals are alternatingly activated at a predetermined period T in the manner exemplified along two upper rows labelled VRCNT and ARCNT. Under the circumstances, the multiplexer 43 supplies the device output terminal 35 as a multiplexed video and audio data signal with the video data VD and the audio data AD in video time slots TV and in audio time slots TA of each period T as illustrated along a single lower row.

Figure 2:
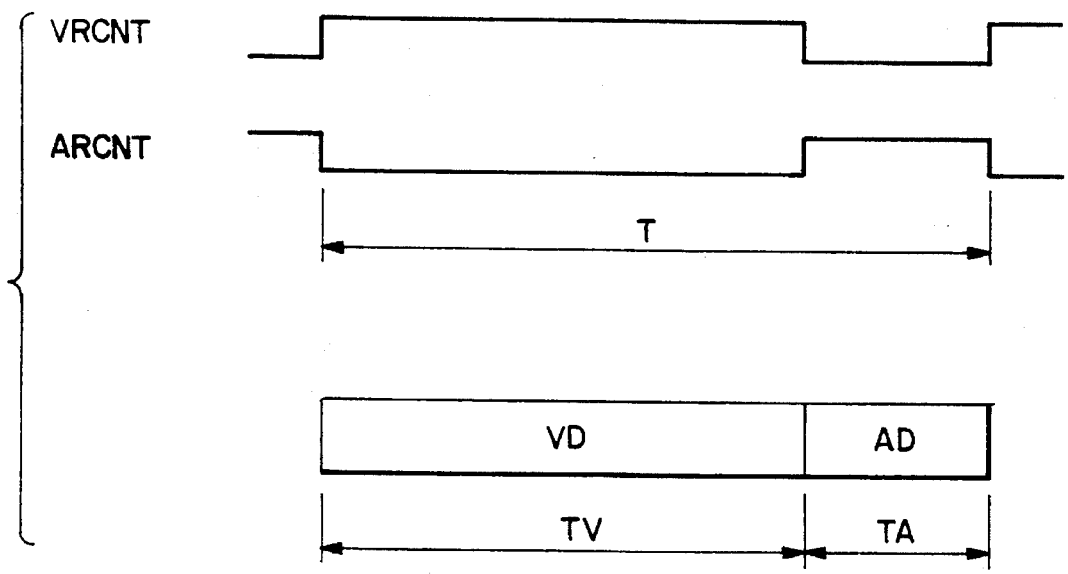
FIG. 2 is a schematic time chart for use in describing operation of the data multiplexer device depicted in FIG. 1.
Figure 3:
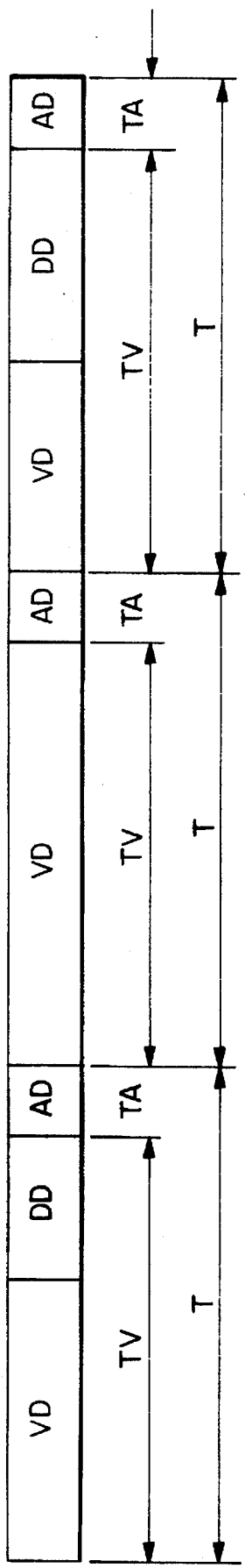
FIG. 3 is a schematic representation of a multiplexed video and audio signal produced by the data multiplexer device illustrated in FIG. 1.

Turning to FIG. 3 with FIGS. 1 and 2 continuously referred to, it should be noted that the video data represent video information of an amount which varies from time to time. In order that the video information may not be lost, the video time slots must be greater in number in each period than the audio time slots. More particularly, the number of the video time slots must be sufficient to cover a maximum amount of the video information read out of the buffer memory 39. The multiplexer 43 therefore inserts dummy data DD in the video data VD on multiplexing the video and the audio data into the multiplexed video and audio data signal.

Figure 4:
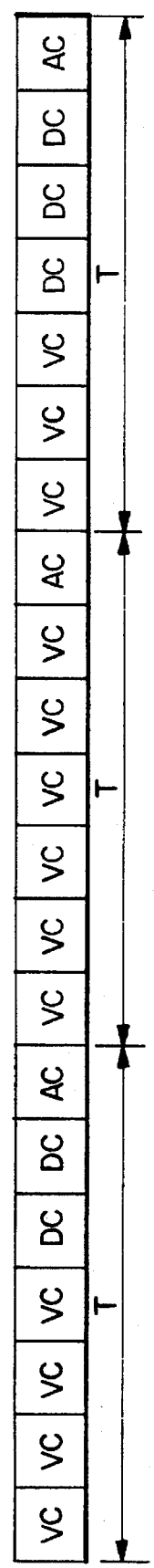
FIG. 4 is a schematic representation of a cell multiplexed video and audio signal produced by the data multiplexer device illustrated in FIG. 1.

Further turning to FIG. 4 with FIGS. 1 through 3 continually referred to, it is possible to understand that the video read control signal is used in reading the buffer memory 39 to produce the video and the dummy data with a predetermined common data length given to the video and the dummy data and with additional time slots included in the video and the dummy data. The audio read control signal is used in making the audio encoder 45 produce the audio data with the common data length given thereto and with the additional time slots included therein. In this event, the multiplexer 43 processes the video data, the dummy data, and the audio data into video cells VC, dummy cells DC, and audio cells AC with additional information supplied thereto through a connection (not shown) in the known manner and put in the additional time slots of the video and the audio data. The multiplexer 43 thereby produces the cell multiplexed video and audio signal and serves as a cell multiplexer (43).

The additional information is used in each of the video and the audio cells as a header and/or a trailer of each asynchronous transfer mode (ATM) cell. When used in the video and the audio cells, the additional information is called herein additional video and audio information. It should be noted that use of dummy cells undesiredly gives a deteriorated transmission efficiency to the cell multiplexed video and audio signal.

It should furthermore be noted that use of the buffer memory 39 unavoidably gives rise to a delay of the video data or cells relative to the encoded video signal. Despite presence of the delay, it has been impossible for the conventional data multiplexer device to evaluate the delay.

The cell multiplexed video and audio signal is either transmitted through a transmission medium to a receiver side or stored in a recording medium and is demultiplexed by a data demultiplexer device into reproductions of the original video signal and the original audio signal. In the manner which will later be described, a video buffer memory is used in the data demultiplexer device. This video buffer memory gives rise to another delay. Such delays will be collectively called a propagation delay. Relating to the propagation delay, information is referred to herein as propagation delay information.

In the data demultiplexer device, it has been impossible to know the propagation delay information and to control the propagation delay of the video data or cells included in the cell multiplexed video and audio signal despite the fast that a like propagation delay is kept constant as regards the audio data or cells of the cell multiplexed video and audio signal. This has made it impossible to keep synchronism in the reproductions between the video and the audio signals, namely, to keep the lip synchronism as called in the art.

If the original video signal is digitized into the encoded video signal in a constant bit rate (CBR) fashion, the delay in the buffer memory 39 is in one-to-one correspondence to its buffer occupancy. It is consequently possible to keep the lip synchronism by controlling the video buffer memory based on this one-to-one correspondence. The buffer memory 39 is, however, read out in a variable bit rate (VBR) style. The one-to-one correspondence does not hold between the delay of the video data or cells and the buffer occupancy. As a consequence, it has been impossible by the conventional data multiplexer device to achieve the lip synchronism.

Figure 5:
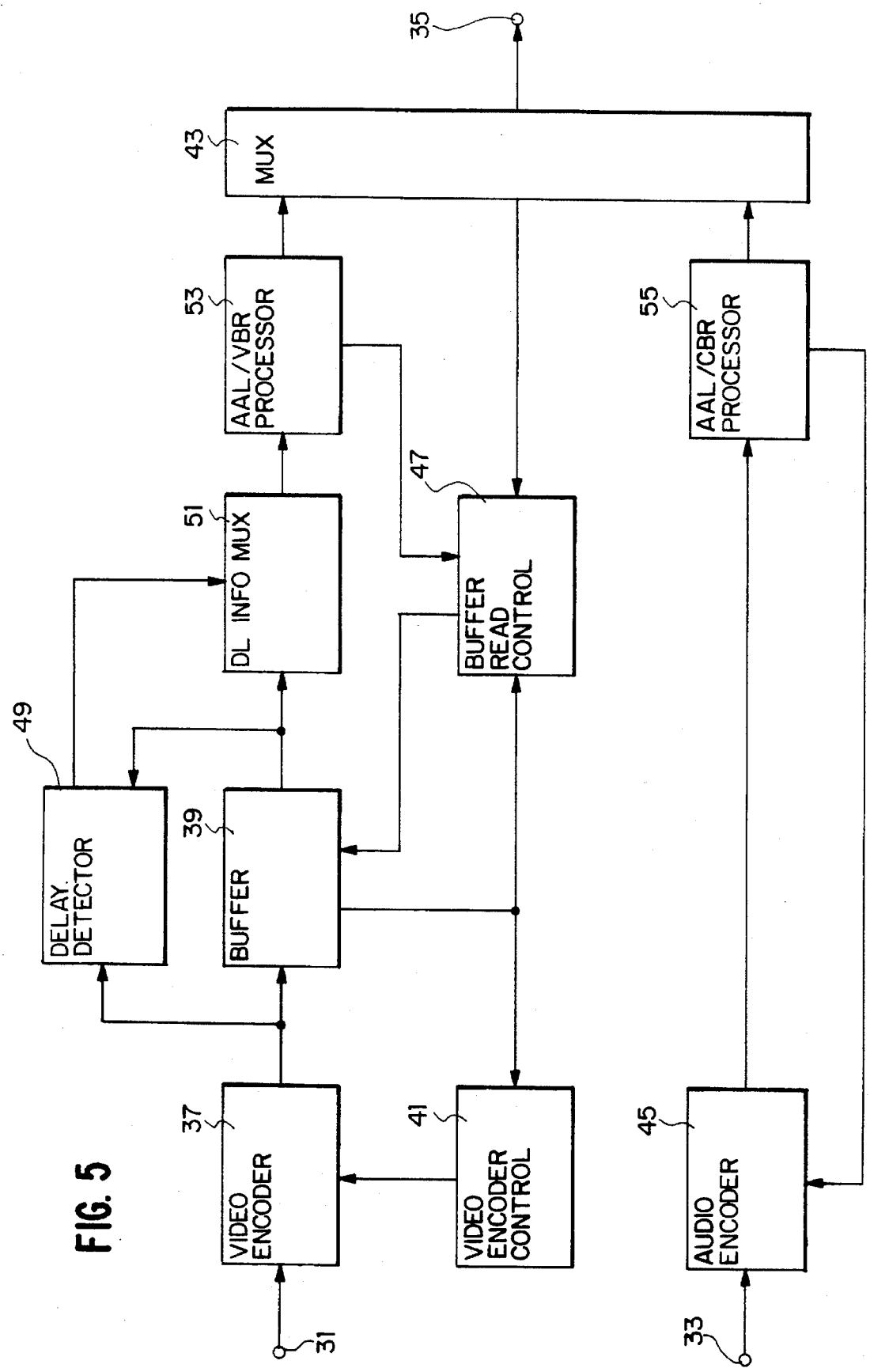
FIG. 5 is a block diagram of a data multiplexer device according to an embodiment of the instant invention.

Referring now to FIG. 5, the description will proceed to a data multiplexer device according to a preferred embodiment of an aspect of this invention. Similar parts are designated by like reference numerals and are similarly operable with likewise named signals. Structure of these parts will later be described in greater detail.

in the example being illustrated, the video encoder 37 produces the encoded video signal as a succession of video frame data, each including a unique word UW, a predetermined time slot TD, and an encoded video datum VD as a frame structure. Like in FIG. 1, operation of the video encoder 37 is controlled by the video encoder controller 41 to which the buffer memory 39 delivers a buffer occupancy signal BOC representative of its buffer occupancy. When the buffer occupancy becomes zero while the buffer memory 39 is read out, the video encoder control signal is used to suspend operation of the video encoder 37. In addition, the video encoder 37 may produce the video frame data with data compression as in FIG. 1.

Responsive to the video read control signal, the buffer memory 39 produces at the variable bit rate a succession of read out video data which now have the common data length and the delay relative to the encoded video data and consequently to the original video signal. Inasmuch as the video frame data are buffered as a buffered video datum and are produced as the read out video data, each read out video datum comprises the unique word, the predetermined time slot, and the encoded video datum. In addition, each read out video datum comprises at least one prescribed video time slot.

The video read control signal is now produced by a buffer read controller 47 and is response to the buffer occupancy signal and a cell or clock control signal CLCNT in the manner which will presently be described. Comparing the unique words, one in each of the video frame data and the other in one of the read out video data that corresponds to the video frame datum under consideration, a delay detector 49 detects the delay of the read out video data relative to the video frame data and produces delay information DL representative of the delay. Connected to the buffer memory 39 and to the delay detector 49, a delay information multiplexer (DL INFO MUX) 51 multiplexes the delay information on the predetermined time slot of the read out video datum and produces a succession of delay information multiplexed video data.

Connected to the delay information multiplexer 51, an asynchronous transfer mode adaptation layer (AAL)/variable bit rate processor 53 processes the information multiplexed video data into the video cells described before. More specifically, the asynchronous transfer mode adaptation layer/variable bit rate processor 53 is operable to deal with the read out video data in accordance with procedures standardised in the CCITT Recommendations Nos. I.362 and I.363 and produces the cell control signal indicative of a predetermined common cell length of the video cells. The cell control signal is herein used in indicating the at least one prescribed video time slot.

For delivery to the audio encoder 45, an asynchronous transfer mode adaptation layer/consant bit rate (AAL/CBR) processor 55 produces the audio read control signal ARCNT at a sampling clock period used throughout in the data multiplexer device. Responsive to the audio read control signal, the audio encoder 45 produces the encoded audio signal as a succession of the audio data AD of the common data length. Like the read out video data, each of the audio data comprises an encoded audio datum and at least one prescribed audio time slot. Carrying out the procedures according to the CCITT Recommendations Nos. I.362 and I.363, the asynchronous transfer mode adaptation layer/ constant bit rate processor 55 produces a succession of the audio cells AC of the common cell length with the additional audio information placed in the prescribed audio time slots of the audio data.

Connected to the asynchronous transfer mode adaptation layer/variable and constant bit rate processors 53 and 55, the cell multiplexer 43 multiplexes the video and the audio cells into the cell multiplexed video and audio signal for delivery to the device output terminal 35. When concurrently supplied with the video and the audio cells, the cell multiplexer 43 uses each audio cell with a higher priority degree than one of the video cells that is delivered thereto simultaneously with the audio cell in question. The cell multiplexer 43 furthermore delivers the multiplexer control signal to the buffer read controller 47. It should be noted that the cell multiplexed video and audio signal indicates the propagation delay information carried by each video cell for use in the data demultiplexer device.

Referring afresh to FIG. 6 and again to FIG. 5, the cell control signal is alternatively called a timing signal and is illustrated along a first or top row labelled CLCNT to comprise first through fourth rectangular pulses. Two adjacent ones of the rectangular pulses define the common cell length as will shortly become clear. It will be presumed in the manner exemplified along a second row labelled ACELL that the asynchronous transfer mode adaptation layer/consant bit rate processor 55 produces one of the audio cells as a first audio cell A(1) during the common cell length defined by the second and the third rectangular pulses. The first audie cell includes a header and a trailer which are indicated by hatched areas. The processor 53 has a signal producing terminal from which the timing signal is produced and which serves as signal producing means.

Supplied with the first audio cell, the cell multiplexer 43 makes the multiplexer control signal rise from a low level to a high level and fall down from the high level to the low level in the manner depicted along a third row labelled MUXCNT. The multiplexer control signal keeps the high level throughout the common cell or data length. The multiplexer control signal is alternatively called a concurrence signal for the reason which will shortly become clearer.

It will furthermore be presumed that the buffer memory 39 first keeps the buffered video datum when the first rectangular pulse appears in the cell control signal. In the meantime, the buffer occupancy signal does not indicate zero as depicted along a fourth row labelled BOC. In the manner depicted along a fifth row labelled VENT, the video read control signal is given a rectangular pulse concurrently with the first rectangular pulse of the cell control signal and rises from a low level to a high level from build up of the second rectangular pulse. The buffer memory 39 produces the read out video data which are processed into first and second video cells V(1) and V(2) as depicted along a sixth row labelled VCELL.

It will further be presumed that the buffer memory 39 becomes empty when the second video cell is produced. The buffer occupancy signal indicates a zero (0) buffer occupancy. The high level of the multiplexer control signal and the buffer occupancy signal indicative of the zero buffer occupancy keep the video read control signal at the high level. Meanwhile, no read out video data are read from the buffer memory 39. The asynchronous transfer mode adaptation layer/variable bit rate processor 53 produces an empty cell EMP.

When the buffered video datum is again stored in the buffer memory 39 and furthermore if the multiplexer control signal is kept at the low level, build down of the rectangular pulse of the cell control signal, such as the fourth recangular pulse, makes the video read control signal fall from the high level to the low level. In response, the buffer memory 39 produces another read out video datum which is processed into a third video cell V(3).

With the higher priority degree given to the audio cell or cells, the cell multiplexer 43 multiplexes the video and the audio cells into the cell multiplexed video and audio signal in the manner depicted along a seventh or bottom row labelled OUT. The second video cell is shifted and placed in the empty cell. The multiplexer control signal indicates such suspension of use of the read out video datum or data as the video cell or cells.

Figure 6:
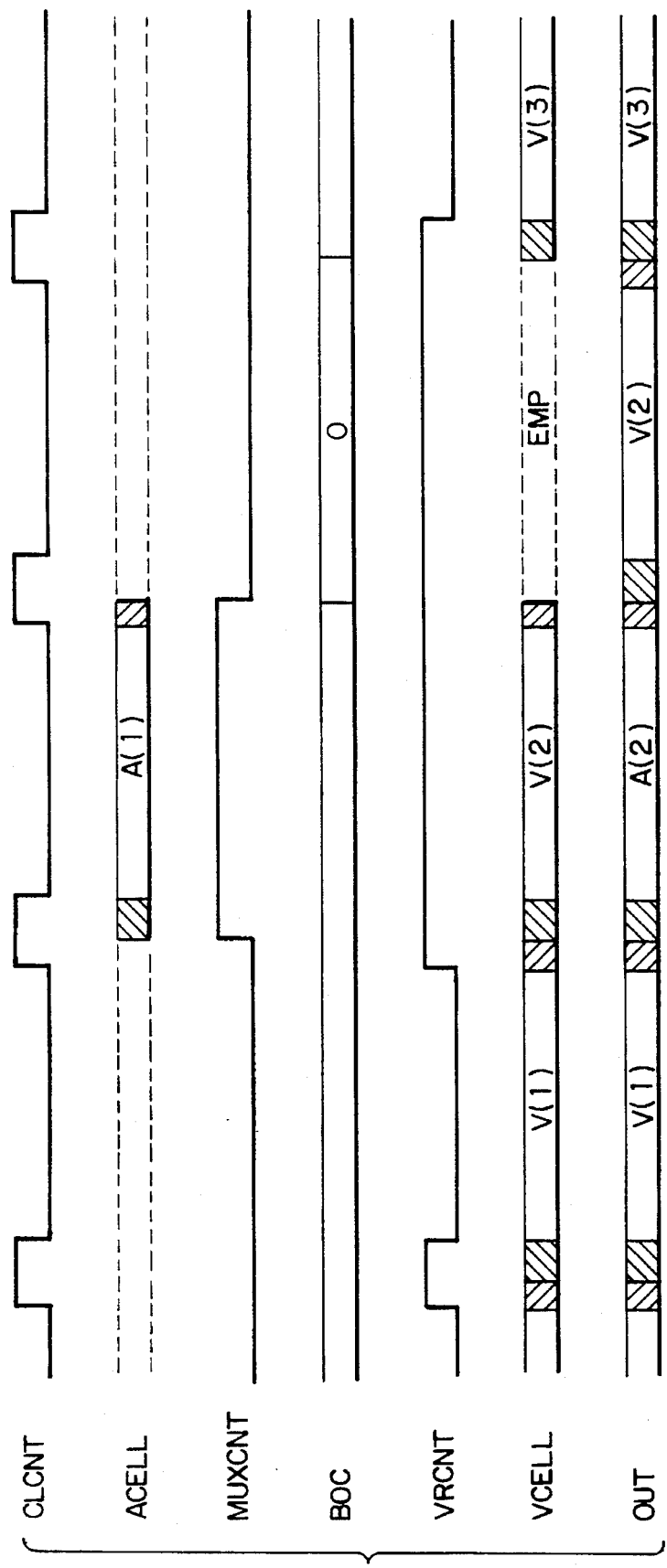
FIG. 6 schematically shows a time chart for use in describing operation of the data multiplexer device illustrated in FIG. 5.

Reviewing FIG. 5 and particularly FIG. 6, the buffer read controller 47 makes the video read control signal VRCNT suspend read out of the buffer memory 39 in each of three following cases (1) to (3). In case (1), the buffer occupancy signal BOC indicates the zero buffer occupancy. In case (2), each rectangular pulse appears in the cell control signal CLCNT to indicate the at least one prescribed video time slot for insertion of the additional video information into the video cell or cells. In case (3), the multiplexer control signal MUXCNT is given the high level to indicate production of the audio cell or cells of the constant bit rate rather than production of the video cells of the variable bit rate. The header may indicate the manner of production of the video and the audio cells, namely, the variable and the constant bit rates.

Figure 7:
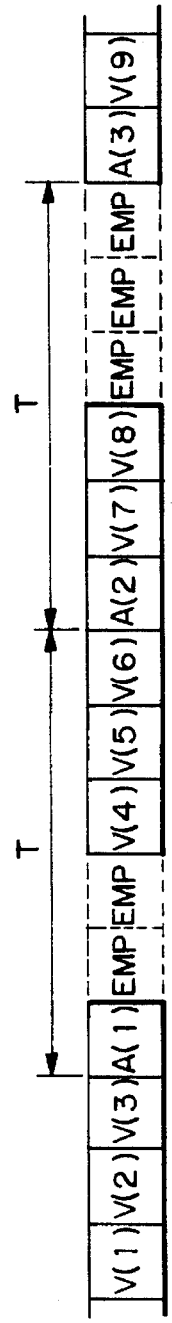
FIG. 7 is a schematic representation of a cell multiplexed video and audio signal produced by the data multiplexer device illustrated in FIG. 5.

Turning to FIG. 7, each predetermined period T consists of a predetermined number of consecutive cell lengths, such as six consecutive cell lengths exemplified in FIG. 6. Besides used in placing the video cell or cells, the empty cells EMP may be left as such in the cell multiplexed video and audio signal. It is possible to use such empty cells in conveying other information other than the video and the audio cells. This given an excellent transmission efficiency to the cell multiplexed video and audio signal.

Figure 8:
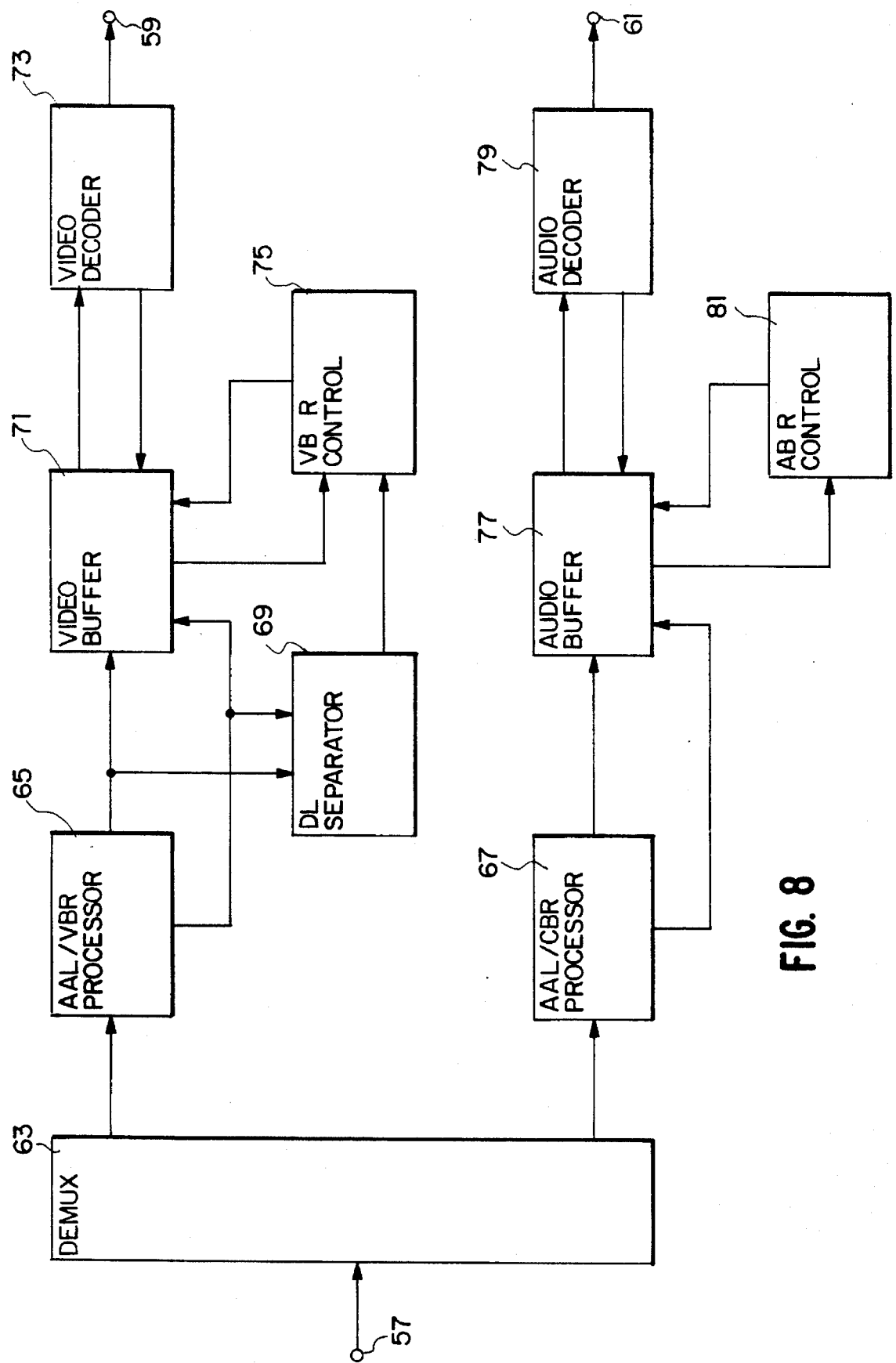
FIG. 8 is a block diagram of a data demultiplexer device for use as a counterpart of the data multiplexer device depicted in FIG. 5.

Referring now to FIG. 8, attention will be directed to a data demultiplexer device according to a preferred embodiment of a different aspect of this invention. The data demultiplexer device has a device input terminal 57, a video output terminal 59, and an audio output terminal 61. The device input terminal 57 is supplied with the cell multiplexed video and audio signal of the type described in the foregoing. Demultiplexed from the cell multiplexed video and audio signal, a reproduction of an original video signal is delivred to the video output terminal 59. A like reproduction of an original audio signal is fed to the audio output terminal 61.

With reference to the header indicative of the variable and the constant bit rates in the cell multiplexed video and audio signal supplied from the device input terminal 57, a demultiplexer (DEMUX) 63 produces the video cells as video cell data and the audio cells as audio cell data. The propagation delay information is included in the video cell data. It is consequently possible to understand that the video cell data as multiplexed data which have the common cell length and in which the video cells and the propagation delay information are multiplexed in a time divison fashion.

The video and the audio cell data are delivered to asynchronous transfer mode adaptation layer/variable and constant bit rate processors 65 and 67, each of which is operable to carry out the procedures standardized in accordance with the CCITT Recommendations Nos. I.362 and I.363. Based on the additional video and audio information, the processors 65 and 67 deal with cell losses and with the asynchronous transfer mode cells which may erroneously be delivered to the data demultiplexer device being illustrated. These processors 65 and 57 will hereunder be referred to briefly as a video processor 65 and as an audio processor 67.

From the cell multiplexed video and audio signal which is now correctly supplied from the demultiplexer 63, the video processor 65 separates effective video data as separated video data which correspond to the delay information multiplexed video data produced by the delay information multiplexer 51 described in conjunction with FIG. 5. Producing the separated video data, the video processor 65 produces a video write control signal VWCNT. Similarly, the audio processor 67 produces separated audio data in corresponcence to the audio data described in connection with FIG. 5 and meanwhile produces an audio write control signal AWCNT.

Supplied with the video write control signal, a delay information (DL) separator 69 separates the propagation delay information as separated information and produces a delay information signal DL (the same reference symbol being used) representative of the separated information. More particularly, the separated information is detected by the delay information separator 69 which first detects the delay information multiplexed video data by using the video write control signal and than detects the video frame data by using the frame structure described with reference to FIG. 5.

Besides supply to the delay information separater 69, the separated video data are delivered to the video bffer memory which is mentioned before and is now indicated at 71. By the video write control signal, the video frame data are written in the video buffer memory 71 as buffered video data to a video buffer occupancy.

In the manner which will become clear as the description proceeds, the buffered video data are read from the video buffer memory 71 as read video data for supply to a video decoder 73. In the meantime, the video buffer memory 71 produces a video buffer occupancy signal VBOC representative of the video buffer occupancy. From the video buffer memory 71, the read video data are read with an additional video delay relative to production of the separated video data from the video processor 65.

In order to start read out of the video buffer memory 71, a video buffer read (VB R) controller 75 is supplied with the delay information signal from the delay information separator 69 and with the video buffer occupancy signal from the video buffer memory 71 to produce a video read start signal VRST in the manner which will presently be described. After start of head out of the video buffer memory 71, the video decoder 73 delivers a video read request signal VRRQ to the video buffer memory 71 to receive the read video data and to decode the read video data into the reproduction of the original video signal for supply to the video output terminal 59.

The video buffer read controller 75 produces the video read start signal when two following video conditions (1) and (2) are satisfied. In accordance with the condition (1), the video buffer memory 71 should keep the buffered video data of a minimum buffer occupancy so as not to give rise to underflow of the video buffer memory 71 even if supply thereto of the separated video data may be delayed as a result of a delay in operation of the asynchronous transfer mode network. According to the condition (2), a sum delay of the delay in the buffer memory 39 of FIG. 5 plus the additional video delay becomes equal to a predetermined video delay threshold value THV. In this manner, the read video data are produced from the video buffer memory 71 with the sum delay relative to supply of the encoded video signal to the buffer memory 39 in the data multiplexer device. It is consequently possible in the data multiplexer device to know the propagation delay.

From the audio processor 67, the separated audio data and the audio write control signal are supplied to an audio buffer memory 77. As buffred audio data of an audio buffer occupancy, the audio buffer memory 77 buffers encoded audio data which are represented by the encoded audio signal produced by the audio encoder 45 described in conjunction with FIG. 5. While producing the buffered audio data as read audio data to an audio decoder 79 in response to an audio read request signal ARRQ sent from the audio decoder 79, the audio buffer memory 77 produces an audio buffer occupancy signal ABOC representative of the audio buffer occupancy. The read audio data are delivered to the audio decoder 79 with an audio delay relative to production of the separated audio data by the audio processor 67. The audio decoder 79 decodes the read audio data into the reproduction of the original audio signal for delivery to the audio output terminal 61.

Like the video buffer read controller 75, an audio buffer read (AB R) controller 81 is supplied with the audio buffer occupancy signal and delivers an audio read start signal ARST to the audio buffer memory 77 to start read of the read audio data from the audio buffer memory 77. The audio read start signal is produced when the following audio condition is met. In accordance with the audio condition, the audio buffer occupancy should be at least equal to a minimum audio occupancy AOMIN so that the audio buffer memory 77 may not underflow even if supply thereto of the separated audio data may be delayed due to a delay in the asynchronous transfer mode network.

The audio delay is therefore equal to a time interval THA during which the audio buffer occupancy grows to the minimum audio occupancy. This delay is equal to an overall delay of supply of the read audio data from the audio buffer memory 77 to the audio decoder 79 relative to production of the encoded audio signal by the audio encoder 45 of FIG. 5.

As a consequence, a video time instant of supply of the read video data to the video decoder 73 and an audio time instant of supply of the read audio data to the audio decoder 79 are different by a time difference which is equal to a sum of a difference between the sum delay and the overall delay plus differences in time intervals of operation in the data multiplexer device between the video and the audio encoders 37 and 45 and thereafter and in the data demultiplexer device between supply of the separated video data to the video buffer memory 71 through the demultiplexer 63 and supply of the separated audio data to the audio buffer memory 77 through the demultiplexer 63 if fluctuations are taken out of consideration in time of delivery between the video and the audio cells of the cell multiplexed video and audio signal. It is readily possible to adjust the time of operation of the video and the audio decoders 73 and 79 to compansate for the time difference and to keep the lip synchronism between the reproductions of the original video and audio signals to an extent which gives rise to no problem in practice.

Reviewing FIGS. 5 through 8, it is now appreciated that this invention makes it possible to multiplex the video cells of the variable bit rate type and the audio cells of the constant bit rate type into the cell multiplexed video and audio signal with the empty cells substituted for the dummy cells to achieve an excellent transmission efficiency. Furthermore, this invention makes it possible to demultiplex the cell multiplexed video and audio signal by the use of the propagation delay information into the video cells of the variable bit rate style and the audio cells of the constant bit rate style with the lip synchronism kept between the reproductions of the original video signal and the original audio signal.

Reviewing now FIG. 5, details of structure of the data multiplexer device will be described. FIGS. 5 and 6 are referred to depending on the circumstances.

Referring to FIG. 9, the video encoder 37 comprises a predictive encoder 83 to which the original video signal is delivered from the video input terminal 31. Subjecting the original video signal to predictive encoding, the predictive encoder 83 produces a predictive encoded signal. For quantizing the predictive encoded signal into a quantized signal according to a quantization step, a quantizer 85 is supplied with the video encoder control signal from the video encoder controller 41, which may be a read only memory for producing the video encoder control signal in response to the buffer occupancy signal. Consequently, the video encoder control signal controls the quantization step in accordance with the buffer occupancy of the buffer memory 39. In this manner, the quantized signal is given the variable bit rate. Supplied with the quantized signal, a frame structuring unit 87 gives a frame structure to the quantized signal and produces the succession of the video frame data.

Turning to FIG. 10, the above-mentioned frame structure comprises the unique word UW, the predetermined time slot TD, and the encoded video datum VD when produced from the video encoder 37. Later, the delay information DL is placed in the predetermined time slot by the delay information multiplexer 51. Typically the delay information is represented by sixteen bits. The encoded video data are represented by an appreciably great number of bits depending on the variable bit rate.

Referring to FIG. 11, the audio encoder 45 comprises a digital encoder 89 to which the original audio signal is fed from the audio input terminal 33. Produced from the digital encoder 89, a digitized audio signal is sent to a first-in first-out memory (FIFO) 91 connected to the asynchronous transfer mode adaptation layer/constant bit rate processor 55. Controlled by the audio read control signal, the first-in first-out memory 91 produces the encoded audio signal as the audio data for supply to the processor 55.

Referring to FIG. 12, the buffer memory 39 comprises a static random access memory (SRAM) 93 having a plurality of buffer addresses and supplied from the video encoder 37 with the video frame data. A write address (R) counter 95 is controlled by the unique words in the succession of video frame data sent from the video encoder 37 to specify the buffer addresses as write addresses where the video frame data should be buffered as the buffered datum. A read address (R) counter 97 consecutively specifies the buffer addresses as read addresses from which the buffered datum should be delivered to the delay information multiplexer 51 as the read video data, each of which includes the at least one prescribed video time slot. A subtracter 99 subtracts the read addresses from the write addresses to deliver the buffer occupancy signal to the video encoder controller 41 and furthermore to the buffer read controller 47.

Referring to FIG. 13, the buffer read controller 47 comprises a comparator 101 for comparing the buffer occupancy with zero to give logic one and zero levels to a comparator output signal when the buffer occupancy is not and is equal to zero. Supplied with three input signals, namely, with the comparator output signal, the cell control signal from the asynchronous transfer mode adaptation layer/variable bit rate processor and the multiplexer control signal from the cell multiplexer 43, a three-input OR gate 103 supplies the read address counter 97 of the buffer memory 39 with the video read control signal with the logic one level when at least one of the three input signals have the logic one level.

Figure 14:
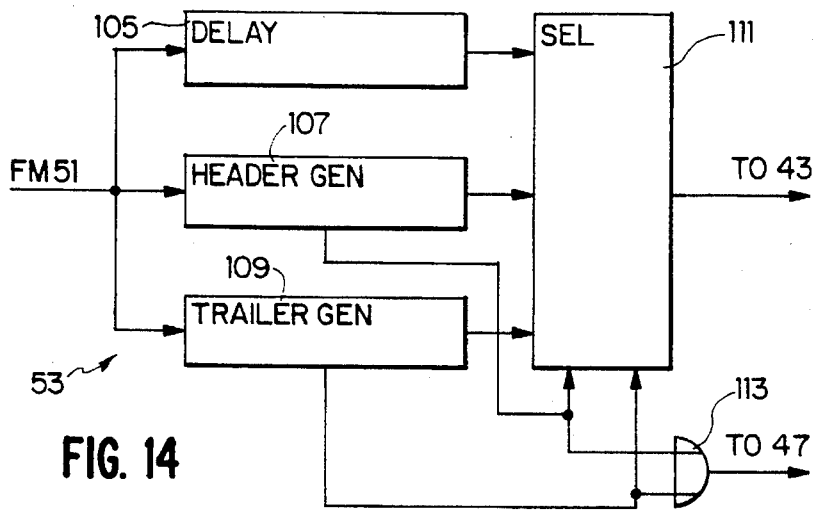
FIG. 14 is a block diagram of an asynchronous transfer mode adaptation layer/variable bit rate processor for use in the data multiplexer device illustrated in FIG. 5.

Referring to FIG. 14, the asynchronous transfer mode adaptation layer/variable bit rate and constant bit rate processors 53 and 55 are similar in structure. Consequently, one processor 53 alone will be described in detail.

In the manner which will be understood by reviewing FIG. 6, a delay circuit 105 gives a delay to each of the delay information multiplexed video data delivered from the delay information multiplexer 51 to produce a delayed datum. A header generator 107 generates the header and produces a first processor control signal. A trailer generator 109 generates the trailer and produces a second processor control signal. For delivery to the cell multiplexer 43, a processor selector (SEL) 111 is first controlled in each interval of the common cell length by the first processor control signal to produce the header as a part of each video cell. Subsequently, the processor selector 111 produces the delayed datum. Finally in the interval of common cell length, the processor selector 111 is controlled by the second processor control signal to produce the trailer of the cell in question. Supplied with the first and the second processor control signals, a two-input OR gate 113 delivers the cell control signal to the buffer read controller 47.

Figure 15:
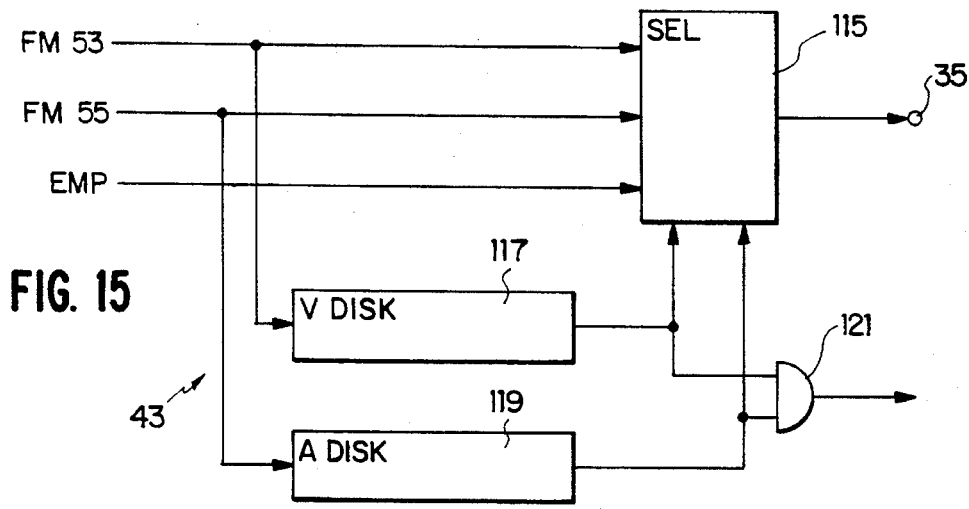
FIG. 15 is a block diagram of a cell multiplexer for use in the data multiplexer device depicted in FIG. 5.

Referring to FIG. 15, the cell multiplexer 43 comprises a multiplexer selector (SEL) 115 supplied with the vedeo and the audio cells VCELL and ACELL from the asynchronous transfer mode adaptation layer/variable and constant bit rate processors 53 and 55 and with no signal for providing the empty cells EMP. The video cells are delivered to a video cell discriminator (V DISC) 117 for discriminating between presence and absence of the video cells to produce a first multiplexer selector signal while presence of the video cells is detected. The audio cells are delivered to an audio cell discriminator (A DISC) 119 for discriminating between presence and absence of the audio cells to produce a second multiplexer selector signal while the audio cells are present. Supplied with the first and the second multiplexer selector signals, an AND gate 121 delivers the multiplexer control signal to the video buffer read controller 47.

Controlled by the second multiplexer selector signal, the multiplexer selector 115 delivers the audio cells to the device output terminal 35 with the higher priority degree. Meanwhile, the video buffer read controller 47 suspends production of the read out video data from the buffer memory 39. Supplied with the first multiplexer selector signal, the multiplexer selector 115 delivers the video cells to the device output terminal 35. When neither the first nor the second multiplexer selector signal is produced, the multiplexer selector 115 supplies the empty cell or cells to the device output terminal 35.

Figures 16, 17:
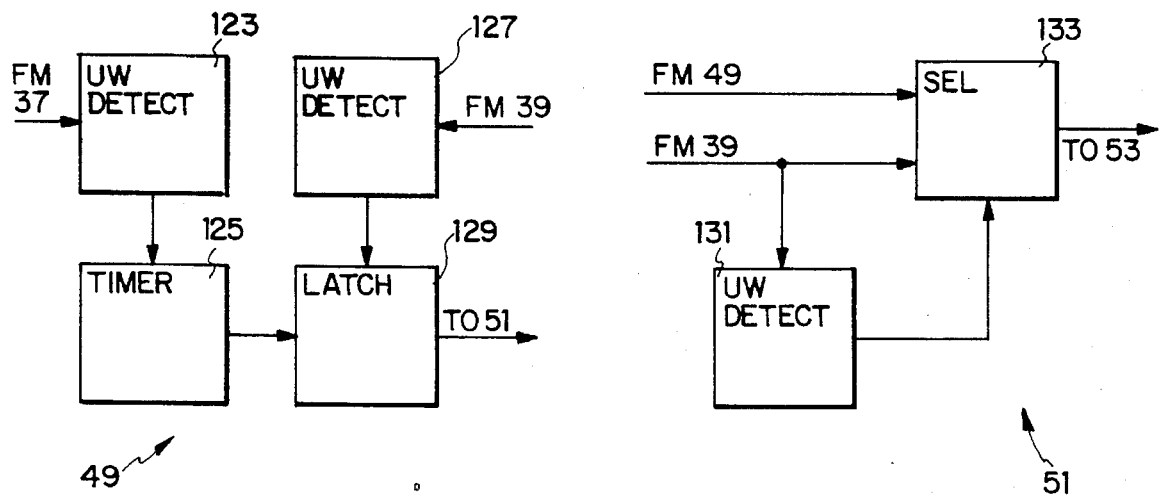
FIG. 16 is a block diagram of a delay detector for use in the data multiplexer device shown in FIG. 5.
FIG. 17 is a block diagram of a delay information multiplexer for use in the data multiplexer device shown in FIG. 5.

Referring to FIG. 16, the delay detector 49 comprises a first unique word detector (UW DETECT) 123 supplied from the video encoder 37 with the video frame data to detect the unique word in each of the video frame data to produce a first unique word detection signal. Reset to zero by this unique word detection signal, a timer counter (TIMER) 125 counts up a bit count in each of the video frame data to produce a count signal representative of the bit count. A second unique word detector 127 is supplied from the buffer memory 39 with the read out video data to detect the unique word in each of the read out video data and to produce a second unique word detection signal.

The count signal is supplied to a latch circuit 129 to update from time to time its content to the bit count which the count signal currently indicates. The second unique word detection signal is delivered to the latch circuit 129 to latch the bit count to which the content is updated. The latch circuit 129 produces a latch circuit output signal representative of the bit count under consideration as the delay information.

Turning to FIG. 170 the delay information multiplexer 51 may comprise an additional unique word detector 131 supplied with the read out video data from the buffer memory 39 to produce an additional unique word detection signal. The read out video data are furthermore delivered to a delay information selector (DL INFO SEL) 133 to which the delay information is supplied from the delay detector 49. In response to the additional unique word detection signal, the delay information selector 133 multiplexes the delay information on the predetermined time slot of each of the read out video data supplied thereto.

Reviewing now FIG. 8, details of structure of the data demultiplexer device will be described. It is surmised that the cell multiplexed video and audio signal is supplied from the data multiplexer device illustrated with reference to FIGS. 5 through 7.

Figure 18:
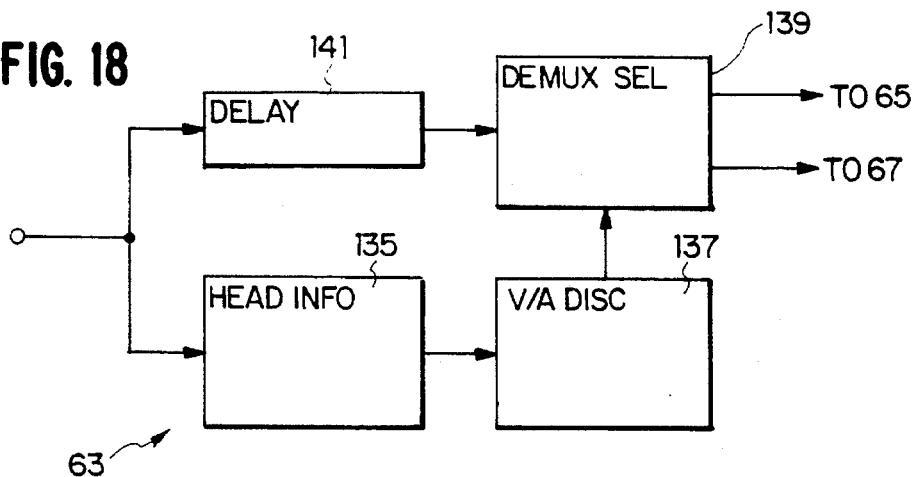
FIG. 18 shows in blocks a cell demultiplexer for use in the data demultiplexer device illustrated in FIG. 8.

Referring to FIG. 18, the cell demultiplexer 63 comprises a cell header information separator (HEAD INFO SEP) 135 supplied from the device input terminal 57 with the cell multiplexed video and audio signal which includes in the headers of the video and the audio cells information indicative of one of the video and the audio cells at a time. Supplied with the information of the headers, a video/audio discriminator (V/A DISC) 137 discriminates between the video and the audio cells to produce a demultiplexer control signal indicative of the video and the audio cells in the cell multiplexed video and audio signal which is currently supplied to a demultiplexer selector (DEMUX SEL) 139 from the device input terminal 57 through a delay circuit 141. The demultiplexer selector 139 delivers the video cells to the video processor 65 and the audio cells to the audio processor 67.

Figure 19:
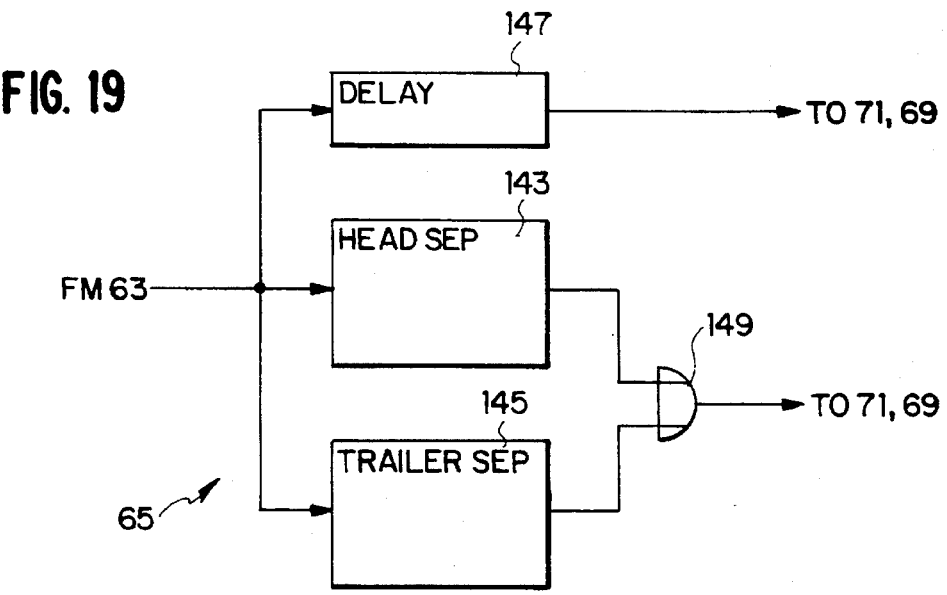
FIG. 19 shows in blocks an asynchronous transfer mode adaptation layer/variable bit rate processor for use in the data demultiplexer device depicted in FIG. 8.

Referring to FIG. 19, the video and the audio processors, namely, the asynchronous transfer mode adaptation layer/ variable and constant bit rate processors 65 and 67, are similar in structure. Consequently, the video processor 65 alone will be described.

In the example being illustrated, a header separator (HEAD SEP) 143 is supplied from the cell demultiplexer 63 with the video cells and separates the header from each video cell to produce a header signal. Similarly, a trailer separator (TRAILER SEP) 145 separates the trailer from each video cell to produce a trailer signal. Supplied from the cell demultiplexer 63 with the video cells, a delay circuit 147 gives the video cells a delay which is necessary in operation of the header and the trailer separators 143 and 145. The delay circuit 147 thereby delivers the separated video data to the video buffer memory 71 and additionally to the delay information separator 69. Supplied with the header and the trailer signals, a two-input OR gate 149 delivers the video write control signal to the video buffer memory 71 and to the delay information separator 69.

Figure 20:
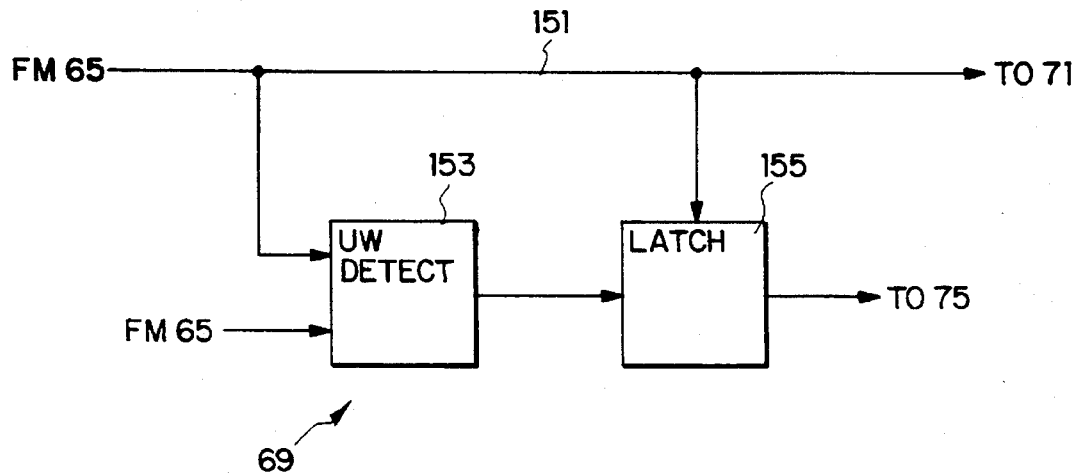
FIG. 20 shows in blocks a delay information separator for use in the data demultiplexer device shown in FIG. 8.

Referring to FIG. 20, a connection 151 is for delivering the separated video data from the video processor 65 to the video buffer memory 71. In the illustrated example, the delay information separator 69 is connected to the connection 151 and comprises a separator unique word detector (UW DETECT) 153 controlled by the video write control signal sent from the video processor 65 to produce a separator unique word detection signal when the unique word is detected in each of the separated video data fed through the connection 151. Activated by the separator unique word detection signal, a latch circuit 155 detects and latches the propagation delay information as the separated information and supplies the video buffer read controller 75 with the information signal indicative of the propagation delay information detected in each separated video datum.

Figure 21:
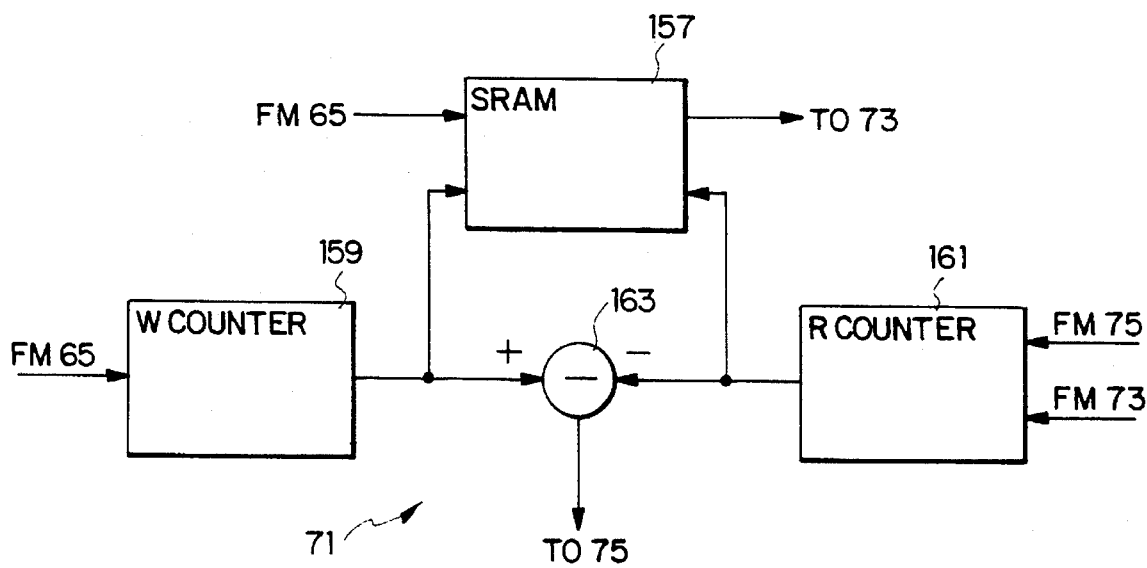
FIG. 21 shows in blocks a video buffer memory for use in the data demultiplexer device depicted in FIG. 8.

Referring to FIG. 21, the video and the audio buffer memories 71 and 77 have a similar structure in common. The video buffer memory 71 alone will therefore be described in detail. It should be noted in this connection that each of the video and the audio buffer memories 71 and 77 are prevented from underflowing in contrast to the buffer memory 39 which is illustrated with reference to FIG. 12 and may have a zero buffer occupancy.

The video buffer memory 71 comprises a static random access memory 157 having a plurality of buffer addresses and supplied from the video processor 65 with the separated video data. A write address (W) counter 159 is controlled by the video write control signal sent from the video processor 65 to consecutively specify by write addresses the buffer addresses where the separated video data are stored as buffered video data. A read address (R) counter 161 is cleared to zero by the video read start signal sent from the video buffer read controller 75 and is controlled by the video read request signal supplied from the video decoder 73 to consecetively specify as read addresses the buffer addresses from which the buffered video data are delivered to the video decoder 73 as the read video data. A subtracter 163 subtracts the read addresses from the write addresses to deliver the video buffer occupancy signal to the video buffer read controller 75.

Figure 22:
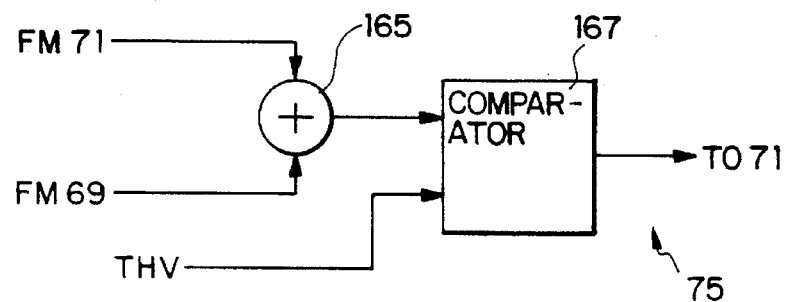
FIG. 22 shows in blocks a video buffer read controller for use in the data demultiplexer device shown in FIG. 8.

Referring to FIG. 22, the video buffer read controller 75 comprises an adder 165 for calculating a sum of the video buffer occupancy signal supplied from the video buffer memory 71 and the delay information signal sent from the delay information selector 69. The sum represents the sum delay and is compared with the above-mentioned video delay threshold value THV by a comparator 167, which delivers the video read start signal to the video buffer memory 71 when the sum delay grows up to the video delay threshold value.

Figure 23:
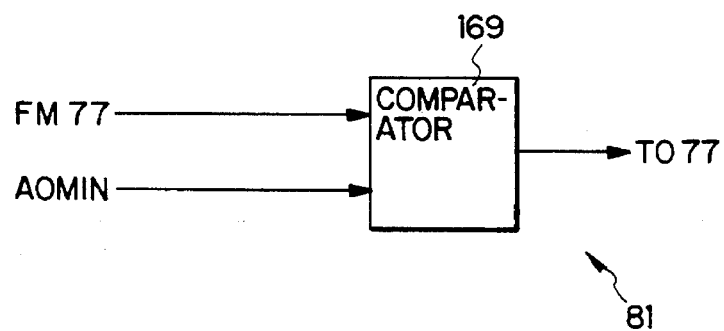
FIG. 23 shows in blocks an audio buffer read controller for use in the data demultiplexer device depicted in FIG. 8.

Turning to FIG. 23, the audio buffer read controller 81 is implemented merely by a comparator 169. Comparing the audio buffer occupancy signal sent from the audio buffer memory 77 with the above-mentioned minimum audio buffer occupancy AOMIN, the comparator 169 delivers the audio read start signal to the audio buffer memory 77 when the minimum audio buffer occupancy is reached by the audio buffer occupancy indicated by the audio buffer occupancy signal.

In FIGS. 20 and 21, it will be understood that the delay information remains in each of the separated and the read video data. This gives rise to no problem in operation of the video decoder 73. It is, however, possible to remove the delay information from the separated video data supplied to the video buffer memory 71 and consequently from the read video data fed to the video decoder 73 if desired. More specifically, the delay information separator 69 is capable of deleting the delay information from the predetermined time slot in response to the selector unique word detection signal and of afresh supplying the connection 151 with only the separated video data which are completely devoid of the delay information and consequently exactly represents the encoded video data produced by the video encoder 37 described in connection with FIGS. 5 and 9.

Reviewing again FIG. 5, it is possible in the data multiplexer device to understand a combination of the buffer memory 39, the delay detector 49, and the delay information multiplexer 51 as a buffer memory unit (39). Under the circumstances, the cell multiplexed video and audio signal may not be capable of indicating the propagation delay information. The data multiplexer device is, however, capable of using no dummy cells in the cell multiplexed video and audio signal.

While this invention has thus far been described in specific conjunction with a single preferred embodiment of the data multiplexer device and a sole preferred embodiment of the data demultiplexer device, it will now be readily possible for one skilled in the art to put this invention into effect in various other manners. For example, it is possible in FIGS. 19 and 20 to use a single unique word detector in common for the video processor 65 and the delay information separator 69.

What is claimed is:

1. A data multiplexing method of multiplexing an original video signal and an original audio signal into a cell multiplexed video and audio signal, comprising the steps of:

encoding said original video signal into an encoded video signal;

buffering said encoded video signal as a buffered video datum;

controlling read out of said buffered video datum as video data of a predetermined common data length;

processing said video data into video cells with addition of additional video information to each of said video data;

encoding said original audio signal into an encoded audio signal;

processing said encoded audio signal into audio cells with addition of additional audio information to each of audio data derived from said encoded audio signal to have said common data length; and multiplexing said video cells and said audio cells into said cell multiplexed video and audio signal;

wherein said buffering step comprises the steps of:

buffering said encoded video signal as said buffered video datum with said video buffering step controlled by said controlling step to produce read out data of said common data length with each of said read out data produced with a delay after said encoded video signal is stored as said buffered video datum;

delay detecting said delay as delay information by comparing said encoded video signal with each of said read out data; and delay information multiplexing said read out data and said delay information into said video data.

2. A data multiplexing method as claimed in claim 1, wherein:

said original video signal encoding step produces, as said encoded video signal, a succession of video frame data of said common data length with a frame structure comprising a unique word common to said video frame data, a predetermined time slot, and encoded video data specific to said video frame data;

said video buffering step producing said read out data with said frame structure in one-to-one correspondence to said video frame data;

said delay detecting step detecting said delay by comparing the unique word of each of said video frame data with the unique word of one of said read out data that corresponds to said each of video frame data;

said delay information multiplexing step multiplexing said delay information on said predetermined time slot to produce said video data.

3. A data multiplexing method as claimed in claim 2, wherein said multiplexing step comprises the steps of:

cell multiplexing said video cells and said audio cells into said cell multiplexed video and audio signal;

video cell detecting whether or not each of said video cells is currently handed from said video data processing step over to said cell multiplexing step, said video cell detecting step producing video cell presence and absent signals when said video cells are and are not handed to said cell multiplexing step;

audio cell detecting whether or not each of said audio cells is currently handed from said audio signal processing step over to said cell multiplexing step, said audio cell detecting step producing audio cell presence and absence signals when said audio cells are and are not handed to said cell multiplexing step;

signal production detecting whether or not said video cell presence signal and said audio cell presence signal are produced; and selecting one of said audio cells with a higher priority degree than at least one of said video cells when said video cell presence signal and said audio cell presence signal are concurrently produced, so that said audio cell is placed before said video cell in said cell multiplexed video and audio signal during said cell multiplexing step.

4. A data multiplexing method as claimed in claim 3, wherein:

said signal production detecting step produces a multiplexer control signal only when said video cell presence signal and said audio cell presence signal are concurrently produced;

said video buffering step comprising the steps of:

video buffering said encoded video signal as said buffered video datum of a buffer occupancy, said video buffering step being controlled by said controlling step to produce said buffered video datum as said video data with said buffer occupancy reduced; and buffer occupancy detecting whether or not said buffer occupancy is equal to zero, said buffer occupancy detecting step producing a zero occupancy signal when said buffer occupancy is reduced to zero;

said video data processing step comprising the steps of:

processing said video data into said video cells with at least one prescribed video time slot included in each of said video cells and with a cell control signal produced throughout said at least one prescribed video time slot; and additional video information multiplexing said additional video information on said at least one prescribed video time slot;

said control step suspending production of said video data while at least one of said multiplexer control signal, said zero occupancy signal, and said cell control signal is produced.

5. A data multiplexer device for multiplexing an original video signal and an original audio signal into a cell multiplexed video and audio signal, comprising:

video encoder means for encoding said original video signal into an encoded video signal;

buffer means for buffering said encoded video signal as a buffered video datum;

control means for controlling read out of said buffered video datum to produce video data of a predetermined common data length;

video processor means for processing said video data into video cells with addition of additional video information to each of said video data;

audio encoding means for encoding said original audio signal into an encoded audio signal;

audio processor means for processing said encoded audio signal into audio cells by adding additional audio information to each of audio data derived from said encoded audio signal to have said common data length; and multiplexer means for multiplexing said video cells and said audio cells into said cell multiplexed video and audio signal; wherein said buffer means comprises:

video buffer means for buffering said encoded video signal as said buffered video datum, said video buffer means being controlled by said control means to produce read out data of said common data length with each of said read out data produced with a delay after said encoded video signal is stored in said video buffer means as said buffered video datum;

delay detector means responsive to said encoded video signal and said read out data for detecting said delay as delay information; and delay information multiplexer means for multiplexing said read out data and said delay information into said video data.

6. A data multiplexer device as claimed in claim 5, wherein said multiplexer means comprise:

video and audio cell detector means for detecting whether or not one of said video cells and one of said audio cells are concurrently delivered from said video and said audio processor means, said video and audio cell detector means producing a concurrence signal when said one of video cells and said one of audio cells are concurrently delivered to said multiplexer means; and selector means responsive to said concurrence signal for selecting said one of audio cells with a higher priority degree than said one of video cells for delivery to a device output of said multiplexer means.

7. A data multiplexer device as claimed in claim 6, wherein said video and audio cell detector means comprises:

video cell detector means for detecting whether or not each of said video cells is currently supplied from said video processor means to said multiplexer means, said video cell detector means producing video cell presence and absence signals when said video cells are and are not supplied to said multiplexer means;

audio cell detector means for detecting whether or not each of said audio cells is currently supplied from said audio processor means to said multiplexer means, said audio cell detector means producing audio cell presence and absence signals when said audio cells are and are not supplied to said multiplexer means; and signal production detector means for detecting whether or not said video cell presence signal and said audio cell presence signal are produced, said signal production detector means producing said concurrence signal when said video and said audio cell presence signals are concurrently produced.

8. A data multiplexer device as claimed in claim 6, wherein:

said video buffer means buffers said encoded video signal as the buffered video datum of a buffer occupancy with said buffer occupancy decreased when each of said read out data is produced;

said buffer means comprising in addition to said video buffer means occupancy detector means for detecting whether or not said buffer occupancy is equal to zero, said buffer occupancy detector means producing a zero occupancy signal when said buffer occupancy is decreased to zero;

said control means suspending production of said buffered video datum as said read out data when at least one of said concurrence signal and said zero occupancy signal is produced.

9. A data multiplexer device as claimed in claim 5, wherein said multiplexer means comprises:

cell multiplexer means for multiplexing said video cells and said audio cells into said cell multiplexed video and audio signal;

video and audio cell detector means for detecting whether or not none of said video cells and of said audio cells are concurrently delivered from said video and said audio processor means to said cell multiplexer means; and means for inserting an empty cell in said cell multiplexed video and audio signal each time when none of said video cells and of said audio cells are delivered to said cell multiplexer means.

10. A data multiplexer device as claimed in claim 5, wherein:

said video encoder means produces, as said encoded video signal, a succession of video frame data of said common data length with a frame structure comprising a unique word, a predetermined time slot, and an encoded video datum;

said video buffer means producing said read out data with said frame structure in one-to-one correspondence to said video frame data;

said delay detector means detecting said delay as delay information by comparing the unique word of each of said video frame data with the unique word of one of said read out data that corresponds to said each of video frame data;

said delay information multiplexer means multiplexing said delay information on said predetermined time slot to produce said video data.

11. A data multiplexer device as claimed in claim 5, wherein said delay detector means comprises:

first unique word detector means responsive to a succession video frame data for detecting the unique word in each of said video frame data to produce a first unique word detection signal;

timer means reset by said first unique word detection signal for counting a delay count;

second unique word detector means responsive to said read out data for detecting the unique word of said one of read out data to produce a second unique word detection signal; and latch means responsive to said second unique word detection signal for latching said delay count as said delay information.

12. A data multiplexing device as claimed in claim 5, wherein:

said video encoder means produces, as said encoded signal, a succession of video frame data of said common data length;

said video buffer means comprising:

a memory comprising a plurality of memory addresses supplied with said frame data;

write address counter means responsive to said frame data for counting said frame data to produce a write address signal indicative of said memory addresses as write addresses to store said frame data in said write addresses as said buffered video datum;

read address counter means responsive to video read control signals for counting said read control signals to produce a read address signal indicative of said memory addresses as read addresses and to produce said buffered video datum from said read addresses as said video data; and a buffer occupancy detector responsive to said write and said read address signals for producing a buffer occupancy signal indicative of a buffer occupancy with which said buffered video datum is stored in said memory addresses;

said multiplexer means producing a concurrence signal when one of said video cells and one of said audio cells are concurrently supplied thereto;

said control means comprising:

signal producing means for producing a timing signal at a period of said common data length; and means responsive to said buffer occupancy signal, said concurrence signal, and said timing signal for producing each of said video read control signals when said buffer occupancy signal does not indicate a zero buffer occupancy, while said concurrence signal is not produced, or while said timing signal is not produced.

13. A data demultiplexer device for demultiplexing a cell multiplexed video and audio signal into reproductions of an original video signal and of an original audio signal, said cell multiplexed video and audio signal being produced by time division multiplexing video cell data of a predetermined common data length, propagation delay information representative of a delay used in producing said video cell data and in demultiplexing said video cell data into the reproduction of said original video signal, and audio cell data of said common data length, comprising:

demultiplexer means for demultiplexing said cell multiplexed video and audio signal into said audio cell data and multiplexed data of said video cell data and said propagation delay information;

separator means for separating said multiplexed data into separated video data and separated information;

video buffer means for buffering said separated video data as a buffered video datum;

video control means for controlling read out of said buffered video datum as read video data in response to said separated information;

audio buffer means for buffering said audio cell data as a buffered audio datum of an audio buffer occupancy;

audio control means for controlling read out of said buffered audio datum as read audio data in response to said audio buffer occupancy; and decoder means for decoding said read video data and said read audio data into said reproductions.

14. A data demultiplexer device as claimed in claim 13, each of said video cell data and of said audio cell data including a unique word and bit rate information, the bit rate information of said video cell data indicating a variable bit rate, the bit rate information of said audio cell data indicating a constant bit rate, wherein said demultiplexer means comprises:

bit rate information discriminator means responsive to said cell multiplexed video and audio signal for discriminating between said variable and said constant bit rates to produce with a first delay a selector control signal indicative of each of said video cell data and each of said audio cell data one at a time and to produce with an additional second delay each of video write control signals timing the bit rate information in said video cell data and each of audio write control signals timing the bit rate information in said audio cell data;

delay means for delaying said cell multiplexed video and audio signal by said first delay to produce a delayed video and audio signal; and selecting means responsive to said selector control signal for selecting selected video data and selected audio data from said delayed video and audio signal to produce said selected video data as said separated video data following said video write control signals, respectively, and said selected audio data as separated audio data following said audio write control signals, respectively.

15. A data demultiplexer device as claimed in claim 14, each of said video cell data being a multiplexed datum in which said propagation delay information is multiplexed on each of said video cell data immediately following said unique word, wherein said separator means comprises:

a unique word detector responsive to each of said video write control signals and to said unique word for producing a unique word detection signal while said unique word is included in said multiplexed datum; and latching means for latching said propagation delay information as said separated information in response to said unique word detection signal.

16. A data demultiplexer device as claimed in claim 15, wherein:

said video buffer means comprises:

a memory comprising a plurality of memory addresses supplied with said separated video data;

write address counter means responsive to said video write control signals for counting said video write control signals to produce a write address signal indicative of said memory addresses as write addresses and to store said separated video data as said buffered video datum;

read address counter means responsive to video read request signals for counting said video read request signals to produce a read address signal indicative of said memory addresses as read addresses and to produce said buffered video datum as said read video data; and a video buffer occupancy detector responsive to said write and said read address signals for producing a video buffer occupancy signal indicative of a video buffer occupancy with which said buffered video datum is stored in said memory addresses;

said video buffer means being accompanied by means responsive to said read video data for producing said video read request signals;

said video control means comprising:

adder means for calculating a sum of said video buffer occupancy and said separated information to produce a sum signal representative of said sum; and a comparator for comparing said sum with a predetermined video delay threshold value to produce a video read start signal for supply to said read address counter means to start count of said video read request signals when said sum becomes equal at least to said predetermined video delay threshold value.

17. A data demultiplexer device as claimed in claim 15, wherein:

said audio buffer means comprises:

a memory comprising a plurality of memory addresses supplied with said separated audio data;

write address counter means responsive to said audio write control signals for counting said audio write control signals to produce a write address signal indicative of said memory addresses as write addresses and to store said separated audio data as a buffered audio datum;

read address counter means responsive to audio read request signals for counting said audio read request signals to produce a read address signal indicative of said memory addresses as read addresses and to produce said buffered audio datum as said read audio data; and an audio buffer occupancy detector responsive to said write and said read address signals for producing an audio buffer occupancy signal indicative of said audio buffer occupancy;

said audio buffer means being accompanied by means responsive to said read audio data for producing said audio read request signals;

said audio control means comparing said audio buffer occupancy with a predetermined minimum audio occupancy to produce an audio read start signal for supply to said read address counter means to start count of said audio read request signals when said audio buffer occupancy becomes equal at least to said minimum audio occupancy.

* * * * *

UNITED STATES PATENT AND TRADEMARK OFFICE
CERTIFICATE OF CORRECTION

PATENT NO. : 5,561,466
DATED : October 1, 1996
INVENTOR(S) : Takashi KIRIYAMA

It is certified that error appears in the above-indentified patent and that said Letters Patent is hereby corrected as shown below:

Column 6, line 22, delete "in" and insert --In--.

Column 7, line 67, delete "VENT" and insert --VRCNT--.

Column 12, line 22, after "processor" insert --53--.

Signed and Sealed this

Sixth Day of May, 1997

*Attest:*

BRUCE LEHMAN

*Attesting Officer*  Commissioner of Patents and Trademarks